United States Patent [19]

Westwood et al.

[11] 3,945,948

[45] Mar. 23, 1976

[54] CATALYST AND THE PROCESS FOR PREPARING IT

[75] Inventors: Walter Westwood; John Blunden Payne, both of London, England

[73] Assignee: Johnson, Matthey & Co., Limited, London, England

[22] Filed: Dec. 19, 1973

[21] Appl. No.: 426,198

[30] Foreign Application Priority Data

Dec. 22, 1973 United Kingdom.............. 59342/72

[52] U.S. Cl............................. 252/472; 423/213.5
[51] Int. Cl.²..................... B01J 23/46; B01J 23/64
[58] Field of Search...... 252/472, 460, 461, 466 PT; 423/213.2, 213.5; 106/300

[56] References Cited
UNITED STATES PATENTS

| 3,257,163 | 6/1966 | Stiles............................... 423/213.5 |
|---|---|---|
| 3,397,154 | 8/1968 | Talsma............................. 423/213.2 |
| 3,719,739 | 3/1973 | Thompson...................... 252/472 X |
| 3,784,675 | 1/1974 | Kobylinski et al............... 423/213.5 |

FOREIGN PATENTS OR APPLICATIONS 662,460  12/1951  United Kingdom............. 423/213.5

*Primary Examiner*—W. J. Shine
*Attorney, Agent, or Firm*—Cushman, Darby & Cushman

[57] ABSTRACT

This invention relates to catalysts for use in the control of atmospheric pollution. The catalysts of the present invention are especially useful in the purification of exhaust gases from internal combustion engines and comprise oxidised ruthenium or ruthenium dioxide and a base metal oxide which forms a stable mixed metal oxide with ruthenium dioxide. The base metal may be selected from Groups IV and V of the Periodic Table.

5 Claims, No Drawings

CATALYST AND THE PROCESS FOR PREPARING IT

This invention relates to catalysts for use in the control of atmospheric pollution. The catalysts of the present invention are particularly useful as reduction catalysts in the purification of the exhaust gases from internal combustion engines.

Unburned hydrocarbons, partially oxidised hydrocarbons, oxides of nitrogen and carbon monoxide contained in the exhaust gases from internal combustion engines, in addition to a wide variety of other organic compounds produced by well-established processes in the chemical industry, present serious problems of atmospheric contamination. For example, the oxide of nitrogen which is present in diesel exhaust gases is mainly nitric oxide. This is produced during the combustion of diesel fuel by the combination of nitrogen and oxygen at high temperatures and at pressures present in a combustion chamber. The presence of nitric oxide in exhaust gases is particularly hazardous when the engine is used in a confined space or when such engines are used in large numbers in geographical locations having special combinations of climatic conditions.

The use of catalytic purification of exhaust gases is well-established but there is a tendency at the stage in which oxides of nitrogen are reduced to nitrogen and water for further reduction to take place producing ammonia. We have previously proposed a solution to this problem involving the use of a catalyst comprising a supported alloy of platinum, ruthenium and optionally base metel.

Under certain circumstances, however, it does appear that at the temperature of operation of automobile exhaust catalysts certain alloys of ruthenium do not exhibit the necessary degree of stability. This is probably a result of ruthenium oxidation on volatilization. Accordingly, it is one object of the present invention to provide automobile exhaust catalyst compositions containing catalytically active ruthenium which is stable over longer periods at high temperatures. Another object ofthe present invention is to provide catalysts containing ruthenium for use in heterogeneous gas phase reactions which are stable at high temperatures.

A further object of the present invention is to decrease the loss of ruthenium as a result of the gas flow transport which occurs in most ceramic or metallic honeycombs which are catalyst supports in automobile exhaust purification.

According to one aspect of the present invention a catalyst for use in the control of atmospheric pollution, e.g. the oxidation or reduction of automobile exhaust fumes, comprises oxidised ruthenium or ruthenium dioxide and a metal oxide which forms a stable mixed oxide with ruthenium dioxide. According to a second aspect of the present invention the catalyst comprises a compound formed by oxidised ruthenium or ruthenium dioxide and a metal oxide in which the metal is selected from Groups IV and V of the Periodic Table. Preferably, the metals of Groups IV and V are titanium, zirconium, hafnium, niobium and bismuth and, of these, we particularly prefer titanium, zirconium and hafnium. The ratio of ruthenium to base metal in the mixed oxide composition may conveniently vary from 5% ruthenium: 95% base metal to 95% ruthenium: 5% base metal (the percentage figures being by weight of element present in the mixed oxide). If a ruthenium rich composition is used, a smaller quantity of composition is coated onto the substrate when compared with the case where only a low ruthenium ratio is used in the oxide composition.

The total amount of composition should be such that the quantity of ruthenium present is preferably within the range of from 0.05 to 10 weight % and more preferably from 0.5 to 2 weight % of the total supported catalyst structure. Concentrations found to be satisfactory are 0.9% w/w and 1.8% w/w.

The following stable compositions are formed as mixed oxides with $RuO_2$.

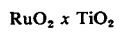
$RuO_2 \; x \; TiO_2$

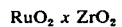
$RuO_2 \; x \; ZrO_2$

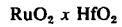
$RuO_2 \; x \; HfO_2$

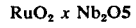
$RuO_2 \; x \; Nb_2O_5$ and

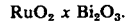
$RuO_2 \; x \; Bi_2O_3$.

The factor $x$ may be fractional but is preferably greater than 1 and suitably ranges from 5–50.

The metal oxide/ruthenium containing composition may be deposited by any known method upon, for example, a high surface area intermediate refractory metal oxide coating deposited upon an ultimate support such as a pelleted ceramic, a corrugated metallic substrate or a porous or a non-porous ceramic honeycomb structure.

Preferably, the ultimate support has applied thereto, as a first coating, a high surface area catalytically active refractory metal oxide and, to the first coating there is applied impregnation or otherwise, the ruthenium or ruthenium dioxide/ metal oxide containing composition. Alternatively the material forming the first coating, layer or deposit may be pre-coated or pre-impregnated with the said ruthenium containing composition prior to the application thereof to the insert material which forms the ultimate support.

EXAMPLE

The pH of a solution containing 10% by weight of ruthenium and 90% by weight of titanium — both metals present as the chloride — was increased in order to precipitate the ruthenium and titanium as hydrated oxide. The hydrated oxide was then dried and ignited at 600°C. In order to convert the ignited precipitate to mixed oxide i.e. $RuO_2 \times TiO_2$ the product was further heated at 1,000°C for two hours. The factor $x$ may be fractional or greater than 1 depending upon the relative proportions of ruthenium and titanium used, in this case $x = 20$.

Three grams of the mixed oxide was then placed in a one inch diameter tube and kept at 800°C for 40 hours during which air was passed over the product at a rate of 1,000 ml per min. After allowing to cool, the final product was reweighed and analysed. It was found that during the forty hour period only two mgm of ruthenium had volatilized from the product. This is very much less than would have volatilized had ruthenium oxide been used alone. In the latter case a figure of 2 mgm. in one hour is obtained.

What we claim is:

1. A catalyst consisting essentially of a mixed oxide obtained by coprecipitating ruthenium and a base metal as hydrated oxides from a solution of ruthenium salt and salt of a base metal selected from the group consisting of titanium, zirconium, hafnium, niobium and bismuth drying and calcining to form said mixed oxide.

2. A catalyst according to claim 1 wherein the ratio of ruthenium to base metal is within the range 5% ruthenium to 95% base metal and 95% ruthenium to 5% base metal, the percentages being by weight of the respective elements in the mixed oxide.

3. A catalyst according to claim 1 wherein the catalyst is deposited on a high surface area intermediate refractory metal oxide and an ultimate support of pelleted ceramic, a corrugated metallic substrate or ceramic honeycomb structure.

4. A catalyst according to claim 1 wherein the inert material has applied thereto as a first coating, a layer or deposit of a refractory oxide and on this first coating there is deposited said mixed oxide containing ruthenium and said metal.

5. A process for preparing the catalyst of claim 8 which comprises forming a solution of ruthenium and base metal halides, precipitating the ruthenium and base metal as hydrated oxide, drying and calcining to form a mixed oxide of the ruthenium and base metal.

* * * * *

UNITED STATES PATENT OFFICE
CERTIFICATE OF CORRECTION

Patent No. 3,945,948     Dated March 23, 1976

Inventor(s) Walter Westwood and James Blunden Payne

It is certified that error appears in the above-identified patent and that said Letters Patent are hereby corrected as shown below:

In item [30]
Foreign Application Priority Data should read:

--Dec. 22, 1972   United Kingdom....59342/72--

Column 2, line 43:   "insert" should be --inert--

Column 2, line 53:   "$RuO_2 X TiO_2$" should be --$RuO_2 x TiO_2$--

Claim 1, line 6: after "bismuth" there should be a comma (,)

Claim 5, line 1: "8" should be --1--

Signed and Sealed this

Thirty-first Day of August 1976

[SEAL]

Attest:

RUTH C. MASON
Attesting Officer

C. MARSHALL DANN
Commissioner of Patents and Trademarks